United States Patent
Lemesle et al.

(10) Patent No.: US 7,652,109 B2
(45) Date of Patent: Jan. 26, 2010

(54) USE OF AN ADDITIVIE FOR IMPROVING THE FLOWABILITY OF FINES AND THEIR REINTRODUCTION INTO A CONTINUOUS GAS-PHASE (CO-) POLYMERISATION OF OLEFINS REACTOR

(75) Inventors: Willy Lemesle, Martigues (FR); Renaud Viguier, Lavera (FR)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 11/666,737

(22) PCT Filed: Oct. 7, 2005

(86) PCT No.: PCT/GB2005/003862

§ 371 (c)(1),
(2), (4) Date: Mar. 10, 2008

(87) PCT Pub. No.: WO2006/054040

PCT Pub. Date: May 26, 2006

(65) Prior Publication Data

US 2008/0214747 A1        Sep. 4, 2008

(30) Foreign Application Priority Data

Nov. 15, 2004   (EP) ................... 04292700

(51) Int. Cl.
*C08F 2/38* (2006.01)
*B01D 45/12* (2006.01)
*C08F 4/78* (2006.01)

(52) U.S. Cl. .......................... 526/68; 526/67; 526/901; 528/484

(58) Field of Classification Search .................. 526/68, 526/67, 901; 528/487, 492, 484
See application file for complete search history.

(56) References Cited

U.S. PATENT DOCUMENTS 5,026,795 A * 6/1991 Hogan ......................... 526/74
6,562,924 B2 * 5/2003 Benazouzz et al. .......... 526/201

FOREIGN PATENT DOCUMENTS

| WO | WO 98/07764 A | 2/1998 |
| WO | WO 99/29406 | 6/1999 |
| WO | WO 01/18066 A1 | 3/2001 |
| WO | WO 01/18067 A1 | 3/2001 |
| WO | WO 02/40554 A1 * | 5/2002 |

* cited by examiner

*Primary Examiner*—Fred M Teskin
(74) *Attorney, Agent, or Firm*—Nixon & Vanderhye

(57) ABSTRACT

The present invention relates to the use of an additive for improving the flowability of fines and their reintroduction into a process for the continuous gas-phase (co-) polymerisation of olefins in a fluidized bed or sub-fluidized bed reactor.

12 Claims, No Drawings

USE OF AN ADDITIVE FOR IMPROVING THE FLOWABILITY OF FINES AND THEIR REINTRODUCTION INTO A CONTINUOUS GAS-PHASE (CO-) POLYMERISATION OF OLEFINS REACTOR

This application is the U.S. National Phase of International Application PCT/GB2005/003862, filed 7 Oct. 2005, which designated the U.S. PCT/GB2005/003862 claims priority to European Application No. 04292700.4 filed 15 Nov. 2004. The entire content of these applications are incorporated herein by reference.

The present invention relates to the use of an additive for improving the flowability of fines and their reintroduction into a continuous gas-phase (co-) polymerisation of olefins in a fluidised bed or sub-fluidised bed reactor. According to a preferred embodiment, the present invention relates to the use of an additive for improving the flowability of fines and their reintroduction into a continuous gas-phase (co-) polymerisation of olefins fluidised bed reactor in the presence of a chromium oxide catalyst.

BACKGROUND OF THE INVENTION

Processes for the co-polymerisation of olefins in the gas phase are well known in the art. Such processes can be conducted, for example, by introducing the gaseous monomer and comonomer into a stirred and/or gas fluidised bed or sub-fluidised bed comprising polyolefin and a catalyst for polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

In the polymerisation of olefins in a sub-fluidised bed reactor, the bed of polymer particles is generally maintained in a sub-fluidised state by means of an ascending gas stream and mechanical agitation. An example of such a process is given in WO 99/29406.

The polymerisation of olefins is an exothermic reaction and it is therefore necessary to provide means to cool the bed to remove the heat of polymerisation. In the absence of such cooling the bed would increase in temperature and, for example, the catalyst would become inactive or the bed would begin to melt. In the fluidised bed polymerisation of olefins, the preferred method for removing the heat of polymerisation is by supplying the fluidising gas to the polymerisation reactor at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas is used to supply the monomer to the bed, to fluidise the bed, and to maintain the bed at the desired temperature. Monomers consumed by the polymerisation reaction are normally replaced by adding make up gas or liquid to the polymerisation zone or reaction loop.

It is also well known that chromium oxide or "Phillips" catalysts can advantageously be used for the (co-) polymerisation of olefins, particularly in slurry processes as well as in gas phase processes. It is even reported in the literature that chromium oxide catalysts are much less or even not prone to fouling problems in olefin gas phase polymerisation processes in comparison with Ziegler-Natta catalysts which exhibit many fouling problems.

Process aid additives are known to be added to processes for the (co-) polymerisation of olefins in order to try and mitigate problems with fouling.

WO 01/18066 and WO 01/18067, for example, describe the use of a process aid additive in the (co-) polymerisation of olefins in a fluidised bed reactor using a chromium oxide catalyst and a Ziegler-Natta catalyst respectively. WO 01/18066 and WO 01/18067 both disclose, generally, that the additive may be added at any location of the fluidised bed polymerisation system. When a cyclone is present in the recycle line (to separate entrained fine particles from the recycle gas), however, the preferred position for addition of the additive is in the fines recycle line, i.e. after the cyclone, or directly into the polymerisation zone.

SUMMARY OF THE INVENTION

The Applicants have now unexpectedly found a simple and efficient process which allows us to improve the gas phase polymerisation of olefins, especially when using a chromium oxide catalyst. This was done through a detailed analysis of the fines behaviour in the cyclone in the course of the olefin gas phase polymerisation. It was discovered that small flowability problems encountered by the fines in the cyclone could lead to much more important problems, including production of off specification materials, fouled lumps, hot spot phenomena, etc.

In accordance with the present invention, there has now been found a process for the gas-phase (co-) polymerisation of olefins in the presence of a catalyst in a fluidised bed or sub-fluidised bed reactor system comprising the reactor, a recycle line connecting the top, of the reactor to its bottom and a cyclone, the cyclone inlet being connected to the top of the reactor and the cyclone outlet being connected back to the reactor at a lower elevation, wherein polymer particles that are being formed are kept in the fluidised or sub-fluidised state by means of a gaseous reaction mixture travelling as an ascending stream in the reactor, the gas mixture leaving via the top of the fluidised bed or sub-fluidised bed reactor is recycled to the base of the reactor by means of the recycle line, and at least part or preferably all of said gas mixture leaving the top of the fluidised bed or sub-fluidised bed reactor is passed through at least one cyclone in order to separate the gas from the fine particles and the fine particles are recovered from the bottom of the cyclone and recycled back to the reactor, characterised in that a flowability improver additive is added at a location comprised between the top of the reactor and the cyclone entry.

By the process of the present invention the problem of fouling in the cyclone is directly addressed by addition of a flowablility improver additive at a location between the top of the reactor and the cyclone entry i.e. in the line between the reactor outlet and the cyclone entry. In contrast, addition of an additive in the reactor itself or even in a line before the reactor means that the additive will be treating the full range of particles in the reactor, and will have a limited or even negligible subsequent effect on the fines in the cyclone. In addition, it has been found that it is detrimental to add too much additive to the reactor.

Thus, the process of the present invention provides an efficient way of addressing the problems of fouling in the cyclone.

Preferably, the additive comprises at least one of the components selected from:

1) a polysulphone copolymer,
2) a polymeric polyamine, and
3) an oil-soluble sulphonic acid.

Preferably, the catalyst is a chromium oxide catalyst.

Preferably, the additive comprises at least two components selected from above components (1), (2) and (3). More preferably, the additive comprises a mixture of (1), (2) and (3).

According to the present invention, the polysulphone copolymer component of the additive (often designated as olefin-sulphur dioxide copolymer, olefin polysulphones, or poly(olefin sulphone)), is a polymer, preferably a linear polymer, wherein the structure is considered to be that of alternating copolymers of the olefins and sulphur dioxide, having a one-to-one molar ratio of the comonomers with the olefins in head to tail arrangement. Preferably, the polysulphone copolymer consists essentially of about 50 mole percent of units of sulphur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —($C_xH_{2x}$)—COOH wherein x is from 0 to about 17, and B is hydrogen or carboxyl, with the proviso that when B is carboxyl, x is 0, and wherein A and B together can be a dicarboxylic anhydride group.

Preferably, the polysulphone copolymer employed in the present invention has a weight average molecular weight in the range 10,000 to 1,500,000, preferably in the range 50,000 to 900,000. The units derived from the one of more 1-alkenes are preferably derived from straight chain alkenes having 6-18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid. For further details of polysulphones particularly suitable for use in the present invention reference may be made to UK patent specifications 1,432,265, 1,432,266, and US patent specifications 3,811,848 and 3,917,466.

A preferred polysulphone copolymer is 1-decene polysulphone having an inherent viscosity (measured as a 0.5 weight percent solution in toluene at 30° C.) ranging from about 0.04 dl/g to 1.6 dl/g.

According to the present invention, the polymeric polyamine component of the additive is preferably a polymeric polyamine having the general formula:

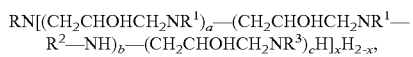

wherein $R^1$ is an aliphatic hydrocarbyl group of 8 to 24 carbon atoms, $R^2$ is an alkylene group of 2 to 6 carbon atoms, $R^3$ is the group —$R^2$—$HNR^1$, R is $R^1$ or an N-aliphatic hydrocarbyl alkylene group having the formula $R^1NHR^2$—;

a, b and c are integers of 0-20 and x is 1 or 2; with the proviso that when R is $R^1$ then a is an integer of 2 to 20 and b=c=0, and when R is $R^1NHR^2$— then a is 0 and b+c is an integer of 2 to 20.

The polymeric polyamines which can be suitably employed in the process of the present invention are described in U.S. Pat. No. 3,917,466, in particular at column 6 line 42 to column 9 line 29.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, e.g. a mixture of xylene and isopropanol, adding a strong base, e.g. sodium hydroxide and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo 130" sold by Universal Oil Company.

According to the present invention, the oil-soluble sulphonic acid component of the additive is preferably any oil-soluble sulphonic acid such as an alkane sulphonic acid or an alkylaryl sulphonic acid. A useful sulphonic acid is petroleum sulphonic acid resulting from treating oils with sulphuric acid.

Preferred oil-soluble sulphonic acids are dodecylbenzene sulphonic acid and dinonylnaphthyl sulphonic acid.

In accordance with the present invention, the additive preferably comprises 1 to 25 weight percent of the polysulphone copolymer, 1 to 25 weight percent of the polymeric polyamine, 1 to 25 weight percent of the oil-soluble sulphonic acid and 25 to 95 weight percent of a solvent. Neglecting the solvent, the additive preferably comprises about 5-70 weight percent polysulphone copolymer, 5-70 weight percent polymeric polyamine, and 5-70 weight percent oil-soluble sulphonic acid; the total of course being 100 percent.

Suitable solvents include aromatic, paraffin and cycloparaffin compounds.

The solvents are preferably selected from among benzene, toluene, xylene, cyclohexane, fuel oil, isobutane, kerosene and mixtures thereof for instance.

According to a preferred embodiment of the present invention, the additive is diluted in a conventional hydrocarbon diluent, which can be the same or different from the above solvent, preferably butane, pentane or hexane.

When a diluent is used, the additive (including the solvent thereof) is preferably present in an amount comprised between 0.1 and 500 g per litre of diluent, preferably between 1 and 50 g per litre of diluent.

According to a preferred embodiment of the present invention, the total weight of components (1), (2), (3), the solvent and the diluent represents essentially 100% of the weight of the additive.

One useful composition, for example, consists of 13.3 weight percent 1:1 copolymer of 1-decene and sulphur dioxide having an inherent viscosity of 0.05 determined as above, 13.3 weight percent of "Polyflo 130" (1:1.5 mole ratio reaction product of N-tallow-1,3-diaminopropane with epichlorohydrin), 7.4 weight percent of either dodecylbyl sulphonic acid or dinonylnaphthyl sulphonic acid, and 66 weight percent of an aromatic solvent which is preferably toluene or kerosene.

Another useful composition, for example, consists of 2 to 7 weight percent 1:1 copolymer of 1-decene and sulphur dioxide having an inherent viscosity of 0.05 determined as above, 2 to 7 weight percent of "Polyflo 130" (1:1.5 mole ratio reaction product of N-tallow-1,3-diaminopropane with epichlorohydrin), 2 to 8 weight percent of either dodecylbyl sulphonic acid or dinonylnaphthyl sulphonic acid, and 78 to 94 weight percent of an aromatic solvent which is preferably a mixture of 10 to 20 weight percent toluene and 62 to 77 weight percent kerosene.

The additive composition of the present invention (including the solvent and diluent therefore) is preferably added in an amount ranging from about 0.02 to about 50000 ppm, preferably from about 0.2 to about 10000 ppm, more preferably from about 2 to 1000 ppm, based on the weight of the olefin introduced into the reactor.

Based on the total weight of just the polysulphone polymer, polymeric amine and oil-soluble sulphonic acid, the preferred concentration of the additive is from about 0.00001 to about 35, preferably from about 0.001 to about 10, more preferably from about 0.1 to about 7.5 parts by weight per million parts by weight of the olefin introduced into the reactor. According to a most preferred embodiment, the additive is added at a rate of 2 to 6 ppm.

The additive can be added continuously or intermittently. In the process according to the present invention, it is preferred to add continuously the additive. Sufficient additive is added in order to maintain the right flowability of the fines in the cyclone.

According to a preferred embodiment of the present invention, the additive is a material sold by Octel under the trade name STADIS, preferably STADIS 450, more preferably STADIS 425, said STADIS components being preferably added at a rate of 0.001 to 50 ppm by weight of the olefin introduced into the reactor and/or at a concentration of 0.01 to 10 ppm by weight of the seed polymer bed in case of pre-load.

The process according to the present invention is suitable for the manufacture of polymers in a continuous gas fluidised bed process or in a continuous sub-fluidised bed process.

Most preferably, the process according to the present invention is a process for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4-C8 alpha-olefins. The preferred alpha-olefins are but-L-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4-C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as C4-C8 alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75-90° C. and for HDPE the temperature is typically 80-112° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

In one embodiment the reactor used in the present invention is capable of producing greater than 300 Kg/hr to about 80,000 Kg/hr or higher of polymer, preferably greater than 10,000 Kg/hr.

The polymerisation reaction is preferably carried out in the presence of a chromium oxide catalyst.

Examples of chromium oxide catalysts according to the present invention are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C.

The catalyst preferably contains from 0.05 to 5%, more preferably from 0.1 to 2%, by weight of chromium.

The catalyst can contain, in addition to the chromium, from 0.1 to 10% of titanium in the form of titanium oxide and/or fluorine and/or aluminium, in particular in the form of aluminium oxide.

The catalyst can be used as it is or optionally in the form of a coated catalyst or prepolymer containing, for example, from $10^{-5}$ to 3, preferably from $10^{-3}$ to $10^{-1}$, millimoles of chromium per gram of polymer. The process of the invention is particularly suited to the use of a non-prepolymerized catalyst, preferably to the direct introduction of a chromium oxide silica supported catalyst.

The chromium oxide catalysts used in the present invention may be used together with a cocatalyst or activator, e.g. an organometallic compound of a metal from groups I to III of the Periodic Classification of the Elements, such as, for example, an organoaluminum compound. This compound is used in particular to purify the reaction gas mixture Examples of catalysts can be found, for example, in EP275675, EP453116, or WO9912978, the contents of which are hereby incorporated by reference.

EXAMPLES

Catalyst Preparation

35 Kg of a catalyst powder, sold under the trade name of EP30X® by Crosfield Catalysts (Warrington, England) was charged to a fluidised bed reactor heated to 50° C. and fluidised with a current of dry nitrogen. This catalyst was composed of a chromium compound supported on a silica containing about 1% by weight of chromium. The reactor was heated from 50 to 150° C. at a rate of 90° C. per hour and maintained at this temperature for 30 minutes. Next, at 150° C., 8 kg of n Butoxy Isopropoxy Titanium was injected. The reactor was maintained for 45 min at 150° C., and then heated to 300° C. at a rate of 90° C. per hour and maintained at this temperature for 2 hours. Next the fluidising nitrogen stream was replaced by a fluidising air stream and the reactor was maintained at 300° C. for another 2 hours. The reactor was then heated at a rate of 90° C. per hour to 500° C. and maintained at 500° C. for 8 hours. Finally the reactor was cooled at a rate of 90° C. per hour to 300° C. The fluidising air stream was replaced by a fluidising nitrogen stream and the reactor cooled to room temperature (25° C.).

35 Kg of an activated catalyst containing 1% by weight of chromium and 4% by weight of titanium was recovered. It was stored in a dry nitrogen atmosphere.

Comparative Examples

The process was carried out in a fluidised bed gas phase polymerisation reactor consisting of a vertical cylinder of diameter 0.74 m and height 7 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a cyclone, a compressor and with a heat transfer means. Opening into the gas recycling line there are, in particular, the feed lines for ethylene, 1-hexene and nitrogen which represent the main constituents of the gas reaction mixture passing through the fluidised bed.

Above the fluidisation grid the reactor contains a fluidised bed consisting of a high density polyethylene powder. The gas reaction mixture passed through the fluidised bed contained ethylene, 1-hexene, hydrogen, pentane and nitrogen.

The catalyst which has been prepared according to the above method was directly introduced into the reactor.

Two runs are performed under the following polymerisation operating conditions:
Temperature=104.5° C.
pC2 (ethylene)=0.82 Mpa
pC5 (pentane)=0.2 MPa
pH2 (hydrogen)=0.3 MPa
Total pressure=2 Mpa
fluidisation velocity=44 cm/s
1-hexene vs ethylene flow rate ratio=3.8 kg hexene per T of ethylene
catalyst introduction rate=80 g/hr
STADIS 425 was injected inside the polymerisation reactor in an amount of 2 ppm compared to ethylene flow rate.

Both runs experienced cyclone blockage, and had to be stopped after, respectively, 5 days and 2 days.

Example 1

A further polymerisation run is performed, under identical conditions to the Comparative Examples except that Stadis 425 is added in the line between reactor outlet and cyclone inlet at a continuous flow rate in an amount of 5 ppm compared to ethylene flow rate.

This run operated for 10 days without encountering any cyclone blockage.

Under these conditions a high density polyethylene with a density of 0.954, a load melt index of 1.5 g/10 minutes under a 5-kg load at 190° C. is manufactured successfully at an output of 200 kg/h with a catalyst productivity of 2500 g of polymer per g of catalyst without any perturbations.

At the end of the run, the cyclone was opened/inspected and revealed no indication of fouling, i.e. the cyclone wall (the cylindrical and the conical sections) was perfectly clean.

Thus, the addition of a flowability improver additive at a location comprised between the top of the reactor and the cyclone entry prevented cyclone blockage and significantly improved the run length.

The invention claimed is:

1. Process for the gas-phase (co-) polymerisation of olefins in the presence of a catalyst in a fluidized bed or sub-fluidised bed reactor system comprising the reactor, a recycle line connecting the top of the reactor to its bottom and a cyclone, the cyclone inlet being connected to the top of the reactor and the cyclone outlet being connected back to the reactor at a lower elevation, the process comprising:

keeping polymer particles that are being formed in a fluidised or sub-fluidised state by means of a gaseous reaction mixture traveling as an ascending stream in the reactor, recycling the gas mixture leaving via the top of the reactor to the base of the reactor by means of the recycle line, passing at least part of said gas mixture leaving the top of the reactor through at least one cyclone in order to separate the gas from the fine particles, recovering the fine particles from the bottom of the cyclone, recycling the fine particles back to the reactor, and adding a flowability improver additive at a location comprised between the top of the reactor and the cyclone entry.

2. Process according to claim 1 wherein the additive comprises at least one of the components selected from:

(1) a polysulphone copolymer, (2) a polymeric polyamine, and (3) an oil-soluble sulphonic acid.

3. Process according to claim 1 wherein the catalyst is a chromium oxide catalyst.

4. Process according to claim 2 wherein the additive comprises at least two components selected from components (1), (2) and (3).

5. Process according to claim 4 wherein the additive comprises a mixture of (1), (2) and (3).

6. Process according to claim 5 wherein the additive comprises about 5-70 weight percent polysulphone copolymer, 5-70 weight percent polymeric polyamine, and 5-70 weight percent oil-soluble sulphonic acid.

7. Process according to claim 1 wherein the additive represents from about 0.00001 to about 35 parts by weight per million parts by weight of the olefin introduced.

8. Process according to claim 1 wherein the sole or main olefin is either ethylene or propylene, and an optional comonomer is selected from the group consisting of but-1-ene, pent-1-ene, hex-1-ene, 4-methylpent-1-ene and oct-1-ene.

9. Process according to claim 8 wherein the main olefin is ethylene and the optional comonomer is selected from the group consisting of but-1-ene, hex-1-ene and 4-methylpent-1-ene.

10. Process according to claim 7 wherein the additive represents from about 0.001 to about 10 parts by weight per million parts by weight of the olefin introduced.

11. Process according to claim 7 wherein the additive represents from about 0.1 to about 7.5 parts by weight per million parts by weight of the olefin introduced.

12. Process according to claim 1, wherein all of said gas mixture leaving the top of the reactor is passed through at least one cyclone in order to separate the gas from the fine particles.

* * * * *